United States Patent
Dividock et al.

[19]

[11] Patent Number: 6,078,255
[45] Date of Patent: Jun. 20, 2000

[54] SYSTEM FOR LOGGING PREMISES HAZARD INSPECTIONS

[75] Inventors: Ellen Marie Dividock, Portage; Anthony Joseph Kamnikar, Johnstown; Elaine M. Lewis, Cresson; Alan Joseph Pepoy, Windber; William Edward Rogers, Sidman, all of Pa.

[73] Assignee: The Gleason Agency, Inc., Johnstown, Pa.

[21] Appl. No.: 09/103,323

[22] Filed: Jun. 23, 1998

[51] Int. Cl.[7] .............................. G08B 1/08; H04Q 5/22; G06K 15/00
[52] U.S. Cl. .............. 340/539; 340/825.15; 340/825.54; 340/825.55; 340/825.35; 235/383
[58] Field of Search ..................................... 340/539, 506, 340/825.54, 825.55, 825.27, 825.15, 825.35, 825.49, 825.36; 235/383, 385

[56] References Cited

U.S. PATENT DOCUMENTS

| | | | |
|---|---|---|---|
| 3,781,845 | 12/1973 | Ellul | 340/306 |
| 4,526,028 | 7/1985 | Hubner | 340/632 |
| 4,658,357 | 4/1987 | Carroll et al. | 340/539 |
| 4,668,940 | 5/1987 | Beard et al. | 340/500 |
| 4,912,552 | 3/1990 | Allison, III et al. | 379/92 |
| 5,008,661 | 4/1991 | Raj | 340/825.54 |
| 5,298,725 | 3/1994 | Fischer | 235/382 |
| 5,438,607 | 8/1995 | Przygoda, Jr. et al. | 379/38 |
| 5,572,192 | 11/1996 | Berube | 340/539 |
| 5,591,974 | 1/1997 | Troyer et al. | 250/336.1 |
| 5,682,328 | 10/1997 | Roeber et al. | 364/550 |
| 5,726,911 | 3/1998 | Canada et al. | 364/550 |
| 5,787,429 | 7/1998 | Nikolin, Jr. | 340/825.54 |

*Primary Examiner*—Donnie L. Crosland
*Attorney, Agent, or Firm*—Duane, Morris & Heckscher LLP

[57] ABSTRACT

A floor safety inspection system uses computer technology to document floor safety walk-around inspection tours by employees and to report the results remotely. Electronic encoding devices represent inspector identity, location and type of hazard situation encountered at the location, which are recorded to identify and remove hazards such as slip-and-fall hazards, to document safety inspections made and to provide evidentiary defense against claims and lawsuits. The system includes software, portable data collectors, electronically encoded buttons, modems, a downloading cradle, and a personal computer. A floor inspector enters his or her identity at the portable data collector, proceeds to visit encoded locations, and checks for and enters codes representing hazards encountered (and preferably also hazards that have been cleaned up). The date and time are recorded with each code. Periodically, data is collected centrally from the portable collector, which is placed in a docking cradle coupled to a modem, by polling over telephone lines (or another communications pathway) from a central computer. The data is processed to provide chronological, management, and exception reports, for auditing compliance with assigned floor inspection tours and for statistical analysis of hazards.

13 Claims, 7 Drawing Sheets

SYSTEM FOR LOGGING PREMISES HAZARD INSPECTIONS

BACKGROUND OF THE INVENTION

1. Field of the Invention

The invention relates to the field of remote data collection, and in particular concerns a system for documenting the occurrence or nonexistence of hazardous conditions at a particular location accessible to occupants at a particular time, as well as the time of correction of such conditions, according to an automated procedure whereby the recorded data can later be substantiated as accurate.

2. Prior Art

Businesses such as supermarkets, malls, department stores and the like that are open to the public, must maintain safe premises for their customers according to a standard of reasonable care. In addition to their interest in maintaining clean and attractive premises to draw in customers, such businesses are interested in the accountability of their employees for correcting any unsafe conditions, in minimizing any dangers to customers and others, and in the costs related to general liability claims, lawsuits, and insurance premiums.

A common source of customer injuries and resulting claims and lawsuits affecting businesses is slips and falls. Some businesses undertake regular periodic walk-around inspection tours according to a schedule to detect "slip-fall" hazards such as wet spills and the like, as well as to identify areas requiring maintenance or custodial attention due to other spillage, leakage, damage such as collapsed displays or other factors. These floor safety inspection tours are advantageously documented to ensure that they are accomplished and also to record any maintenance needs or hazards that are discovered. Typically, a manual paper-based logging system is employed. An employee is assigned to perform safety inspections and makes handwritten entries that note the date and time of each inspection tour, and whether any slip-fall hazards or other requirements were found. Such a log can also note when a spill is cleaned up or a maintenance hazard corrected, and the responsible employee's name and initials.

Manual logging procedures are useful but have weaknesses. Manual logs are readily fabricated or altered after the fact. For example, an employee assigned to perform regular floor safety inspections may have other pressing concerns when an inspection is due. It is easy for the employee to make an entry indicating that an inspection tour was accomplished at a particular time. That entry can be made either contemporaneously without performing the inspection tour, or later. It is difficult and labor-intensive for management to monitor whether inspections are actually being accomplished and to audit the accuracy of manually generated paperwork. As a result, such manual logs lack credibility. The logs are not useful to demonstrate convincingly that a business took reasonable precautions to prevent customer slip-fall injuries, or to provide evidence that a particular hazard either existed or had been corrected at any given time. Entries in such logs may be cryptic or illegible. It may be difficult even to identify the employee who ostensibly performed the inspection tour. These difficulties are aggravated as time passes, and make logs useless as a source of defensive information should a customer claim to have been injured by a hazard that could or should have been discovered, or perhaps never existed at all.

Systems have been proposed for ensuring or at least improving confidence that inspection tours of a building have been regularly and properly accomplished, typically requiring the inspector to operate a recording or signalling device at stations along an inspection route using a key. For example, U.S. Pat. No. 3,781,845—Ellul provides a system for verifying that security guards have visited each location along an inspection route. The guard carries a key card having magnetizable rods. The guard proceeds to checking stations spaced along the route and inserts the magnetizable-rod key card into a box at each station. The boxes contain code defining magnets which may or may not affect the magnetization of the bars in the card. When the round is completed the guard inserts the card into a reporting station where the magnetization of the bars is checked. If each station has been visited, the reporting station sends a signal to a central recording station to indicate completion of the security round. If any stations were missed, no signal is sent to the recording station and the guard is told so. This system effectively monitors whether all the security stations were visited but does not provide a means for logging and reporting information regarding the round, such as security violations that may be encountered at particular times and places.

U.S. Pat. No. 5,298,725—Fischer discloses a security management system that utilizes bar codes to document inspections made by security officers at various areas being inspected. Hand-held data scanners, data transmitters, a personal computer and non-copiable bar code labels. One of the features of the system is its ability to generate tamper proof reports showing the date, time and location of an inspection, and the identity of the inspecting officer. The system employs an incident sheet of bar codes that identify particular security violations.

U.S. Pat. No. 5,572,192—Berube discloses a personal security system that includes features for monitoring guard tours and other surveillance by security personnel. The system includes a plurality of hand-portable radio frequency transmitters, a plurality of fixed transponders at security stations and a control station. The transmitters are used by security personnel to report their positions on guard tours. Each transmitter sends a unique identification code. The receivers monitor the protected area for transmissions, and in combination with the transponders and control station, record the time, transmitter identification and receiver location. At the end of the day, the control station prints a report. While Berube's system discloses generation of a report documenting the identity of the guard making a tour and the time at which each security point was visited, it does not provide a means to report and record the particulars of any unsafe or insecure situations found along the tour route.

In general, remote reporting as described above involves an automated but internal system for recording locations and times. Whereas such internal reporting builds a list under the control of the security organization involved, there is no guarantee that the list has not been altered. As a result, the list is not useful as a mechanism to provide evidence suggesting that, inasmuch as a guard has been proven to have visited a given location at a given time, and preferably reported on security conditions at that location, that security conditions at that time were indeed as reported.

SUMMARY OF THE INVENTION

The present invention provides an automated floor inspection system especially for establishments frequented by members of the public. The invention uses portable data collector technology to document floor safety walk-around inspection tours by employees, including the remote reporting of hazards or maintenance requirements and also the absence of such hazards, in a manner that provides an evidentiary record beyond the control of the establishment to alter.

Good business practice and common law require businesses to take reasonable care to maintain safe premises for their customers. To help meet this requirement, the invention facilitates the completion and documentation of periodic floor safety inspection tours by employees. In its broadest aspects, the present invention provides a system for remotely logging the existence of hazardous conditions in a space accessible to people, including a plurality of electronically-active encoded position markers fixed at locations through-out the space. Each position marker provides a unique code that identifies a particular location within the space. A menu sheet having similarly encoded electronic elements to uniquely identify hazards (or the absence of hazards) is carried by the employee from station to station. The electronic elements or hazard identifiers are read in association with reading the location code of each station. A probe and handheld portable unit comprising an electronic sensor for reading the encoded data of each of the plurality of position markers and hazard identifiers is provided for the employee to successively record into memory one of the location codes and one hazard-related condition code associated with the employee's inspection of the location adjacent to the location markers, for example opposite ends of a supermarket aisle.

The handheld unit is coupleable to a base station or similar means that retrieves the list of location codes and associated hazard-related condition codes read by the probe and stored in memory. The base station communicates with documentation means, remote from the space, in order to transmit the recorded data. The base station accesses the handheld unit, retrieves, downloads and transmits the location codes and the associated hazard-related condition codes to the documentation means, where a record is built that is outside of the access of the establishment to alter.

In a preferred embodiment, encoded electronically active buttons are read by a portable data collector and probe, the same form of encoded buttons (with different codes) being provided for both the position markers and at least a portion of the hazard identifier. When the portable data collector is touched to an encoded button, it senses the unique digital code electronically assigned to that button and records that code in the portable data collector's internal memory. The encoded buttons are permanently programmed with their respective unique codes. The invention uses encoded buttons for three purposes: identity buttons to identify the employee who completed the floor safety inspection tour; location buttons to identify various physical locations throughout the business, e.g., along a route of a walk-around floor safety inspection tour, which need not be a fixed route; and exception buttons to identify exceptions to a no-hazard condition. These exceptions can include, for example, "wet," "broken debris," "bodily fluids," "maintenance-electrical," "maintenance-mechanical," "other," "cleaned-up" or "corrected" and "all-clear" (or all-clear can be assumed by the lack of an exception entry).

The method of the present invention includes the steps of assigning identity, location and hazard identification codes. An identity code is associated with an employee and encoded on an encoder button that is adapted for sensing and recording the identity code. The employee is directed to scan his/her identity button and perform a periodic floor safety inspection tour. The employee touches the probe of a portable data collector to his or her identity encoding button and then each location, and any discovered hazard identifiers in turn, by touching or bringing the probe into proximity with the identity, location and hazard buttons in sequence. This enters the respective codes corresponding to the employee's name or identity into the portable data collector's internal memory, followed by a list of location codes and any associated hazards as the employee tours the space. This sequence records the route of the inspection tour throughout the business premises in the portable data collector's internal memory as the tour proceeds. If no slip-fall hazards are detected during the inspection tour, the tour is completed when the final location button is touched. If the employee detects a slip-fall hazard during the inspection tour, he or she touches the probe to the appropriate exception button (e.g., "wet" or "other"), preferably stays by the hazard to warn people, notifies another employee to clean up or otherwise address the hazard, and when completed (or at a later inspection pass) touches the "cleaned-up" exception button to show that clean-up has occurred. He or she then resumes the inspection tour.

The portable data collector contains an internal clock, whereby each entry of a location and hazard code is date/time stamped in the memory. When not in use, the portable data collector is kept in a downloading cradle or base station. The base station comprises or is coupled in data communication with a telephone modem and with the handheld portable data collector. The base station includes means for retrieving the information stored in the memory of the portable data collector. The cradle can be connected to a standard telephone line (or other communications pathway). Data stored in the cradle may then be accessed and retrieved periodically. For example, once each week, between, e.g., 12:00 midnight and 6:00 a.m., a central computer, located remotely from the site of the cradle, initiates a telephone call each business location following a sequence that has been programmed into the central computer's software. Upon completion of a successful handshaking protocol between the central computer and the portable data collector/downloading cradle/modem combination, the data in the portable data collector's internal memory is transmitted to the central computer. Upon successful acquisition of this data, the portable data collector's internal memory is erased, and the data is saved in the central computer.

Software provided in the central computer includes lookup tables that cross-reference the digital code of each button with the corresponding appropriate information, e.g., either persons' names, physical locations where buttons are fixedly mounted, and exception conditions provided on the menu sheet. Chronological, management and exception reports preferably are produced by the central computer and distributed to business operators and managers, to insurance company claims personnel, and if needed can be consulted by legal defense attorneys as evidence that a particular hazard existed or did not exist at a given time and place.

The reports can be used to audit compliance with predetermined floor safety inspection procedures such as a desired route and span of inspection. The reports can be analyzed statistically to pinpoint problem areas within the business premises, and to identify opportunities to decrease the occurrence of slip-fall hazards. The reports also provide an impartial and unalterable record, and are useful to defend against claims and lawsuits brought by customers.

Because the invention uses portable data collector technology and remote reporting, opportunities for fraud are virtually eliminated. The employee assigned to complete floor safety inspection tours must scan (e.g., physically touch) each encoded location button with the probe. The position marker buttons preferably are spaced along the route of a walk-around tour that encompasses the entire store and are fixed in place. These encoded buttons cannot be photocopied or readily duplicated, as is possible with passive, barcode technology.

Because floor safety inspection tour data is transmitted over telephone lines (or other communications pathway) to a central location, the invention facilitates effective management and protection of the data. Because a centralized data base is maintained off site and out of the control of the establishment, data integrity is assured. Compliance audits are performed using exception reports, which is very time-efficient. Also, management reports are routinely produced for managers, helping them to pinpoint locations within each store where slip-fall hazards might most likely occur, and focus corrective action on these identified locations. Furthermore, the performance of different stores or different shifts can be compared and used, for example, in connection with incentive awards, insurance premium adjustment and the like.

The invention develops floor safety inspection data to clearly and credibly document that the business took reasonable care to prevent customer slip and fall injuries, using chronological reports. As to an injury resulting from a particular slip and fall, the inspection records can be consulted to determine the accuracy of any claim, how long the hazard existed and the identity of the employee conducting inspections at the time. Whether or not a claim is valid, such documentation is very useful in minimizing costs associated with claims and lawsuits. Because the data is automatically collected and cross-referenced and printed from a computer, it is accurate and legible.

BRIEF DESCRIPTION OF THE DRAWINGS

These and other features and advantages of the invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE PREFERRED EMBODIMENTS

Figure 1:
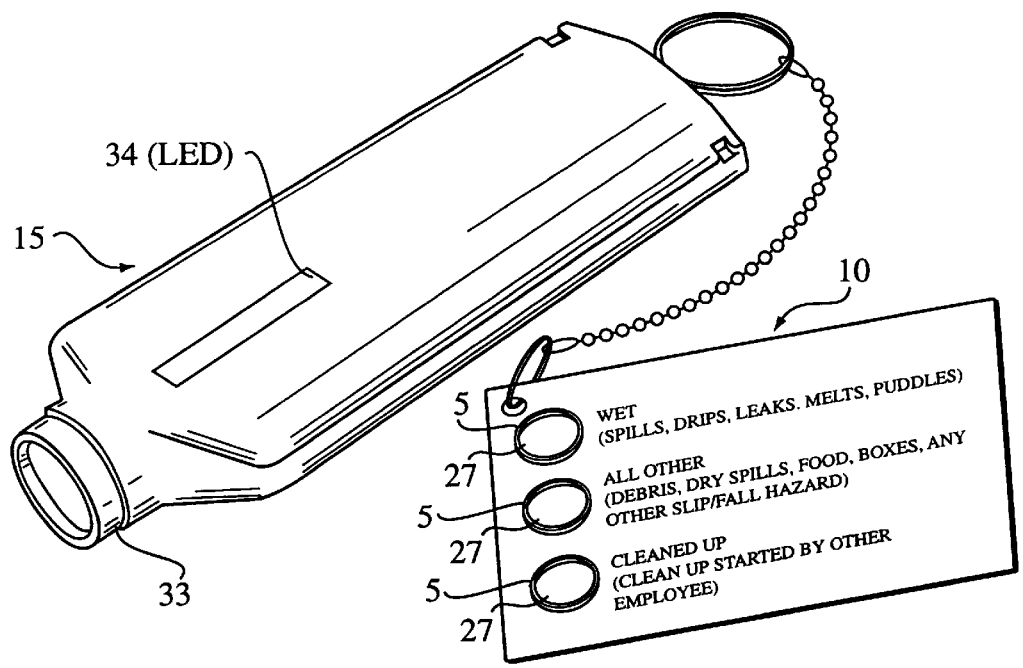
FIG. 1 is a perspective view of a portable data collector including a hazard identifier, attached to the portable data collector, and a preferred embodiment of an electronically active position identifier in the form of a plurality of encoded buttons attached to the hazard identifier.
Figure 2:
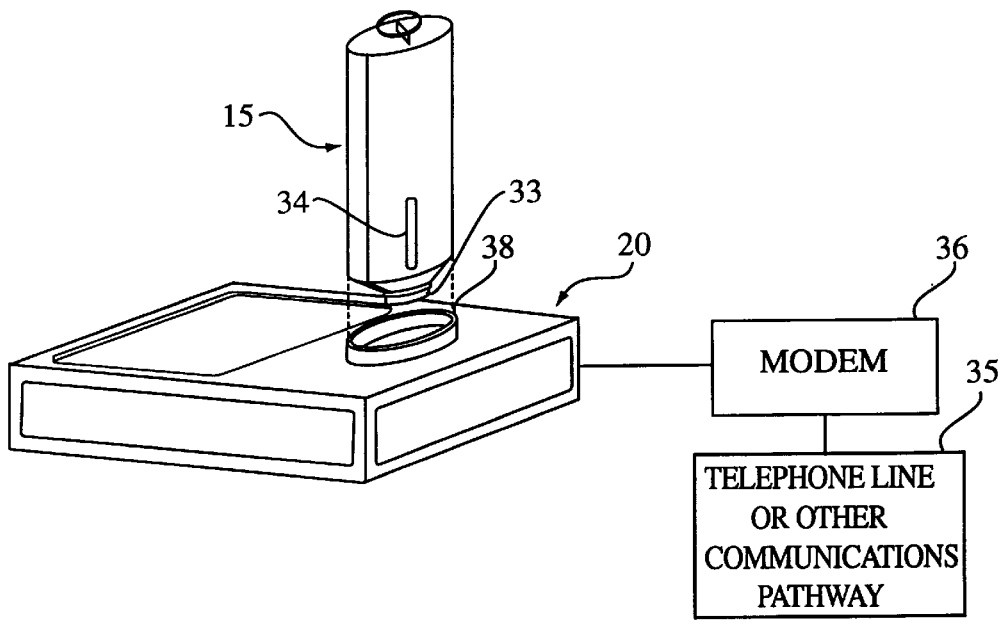
FIG. 2 is a perspective view of a downloading cradle having a portable data collector positioned above its receptacle in the cradle, and about to mate to it; and a schematic view of a modem and telephone line.

Referring to FIGS. 1 and 2, a plurality of electronically active position marker buttons 5, a hazard identifier 10, a portable data collector 15, a downloading cradle 20, and a central computer 25 are provided according to the invention to collect and communicate identity, location and hazard information in an automated manner. More particularly, position or location marker buttons 5 may comprise an electronically encoded active memory device contained in a small water-resistant canister, for example comprising a "two wire" system of activation or containing an RF encoded digital code that can be read out using a corresponding sensor. The marker buttons have unique codes that are cross referenced in the memory of computer 25 to specific identity, location, and exception data that is entered when the system is set up. Scanning the marker buttons into the portable data collector 15 enters the codes and thus indicates that the portable data collection device was operated by a person of known identity at a known location to enter a particular hazard or all-clear code. Each position marker button 5 is encoded with a unique "ID" number that may be unalterable (read-only) and which identifies that particular button, and therefore location. The read-only buttons operate much like an electronic label positioned within a durable shell, such as a metal canister. Each button's canister provides an electrical path for communication with portable data collector 15. Typically, the top 27 of each position marker button 5 is connected to the enclosed memory device and the bottom (not shown) and sides provide a signal ground whereby the code can be read serially out of device.

Portable data collector 15 includes a touch probe 33 that is adapted to read the encoded information from a position marker button 5. Portable data collector 15 is preferably sized to be operated by hand, and includes means for prompting and/or alerting an operator to the successful acquisition of information from a position marker button 5, e.g., an LED display 34, bell, or buzz feature. Portable data collector 15 also includes an internal clock and memory to enter a record of the date and time at which position marker button 5 was successfully read.

Downloading cradle 20 comprises means for accessing the memory of portable data collector 15 and transferring the contents of that memory, via a phone line connection 35, to central computer 25. It will be understood that central computer 25 may be located anywhere relative to downloading cradle 20, e.g., at an Insurer's branch or home offices. Downloading cradle 20 preferably is adapted to be operated remotely over conventional telephone lines 35, which can be a hard wire or cellular line, etc., via an internal or external modem 36. Touch probe 33 is sized and shaped to be seated in a corresponding receptacle 38 on cradle 20, and to be in data communication with cradle 20. Central computer 25 may comprise any of the well known, laptop or desktop personal computers, or any general purpose mainframe computer, programmed to communicate via telephone lines 35, with cradle 20. Cradle 20 can likewise contain a processor, for example with firmware and RAM for operating the code sensor and for managing data storage and communications.

When touch probe 33 is replaced in downloading cradle 20, it is connected to, e.g., modem 36 and telephone line (or other communications pathway) connection 35. In this way, portable data collector 15 is capable of transferring stored data to modem 36, through telephone line (or other communications pathway) 35, to central computer 25. It would be possible to arrange to call out from the downloading cradle through the modem, the transfer being initiated by placement of the portable data collector in the cradle. Preferably, however, the unit goes into an auto-answer mode at that stage and awaits polling from the central computer.

Figure 4:
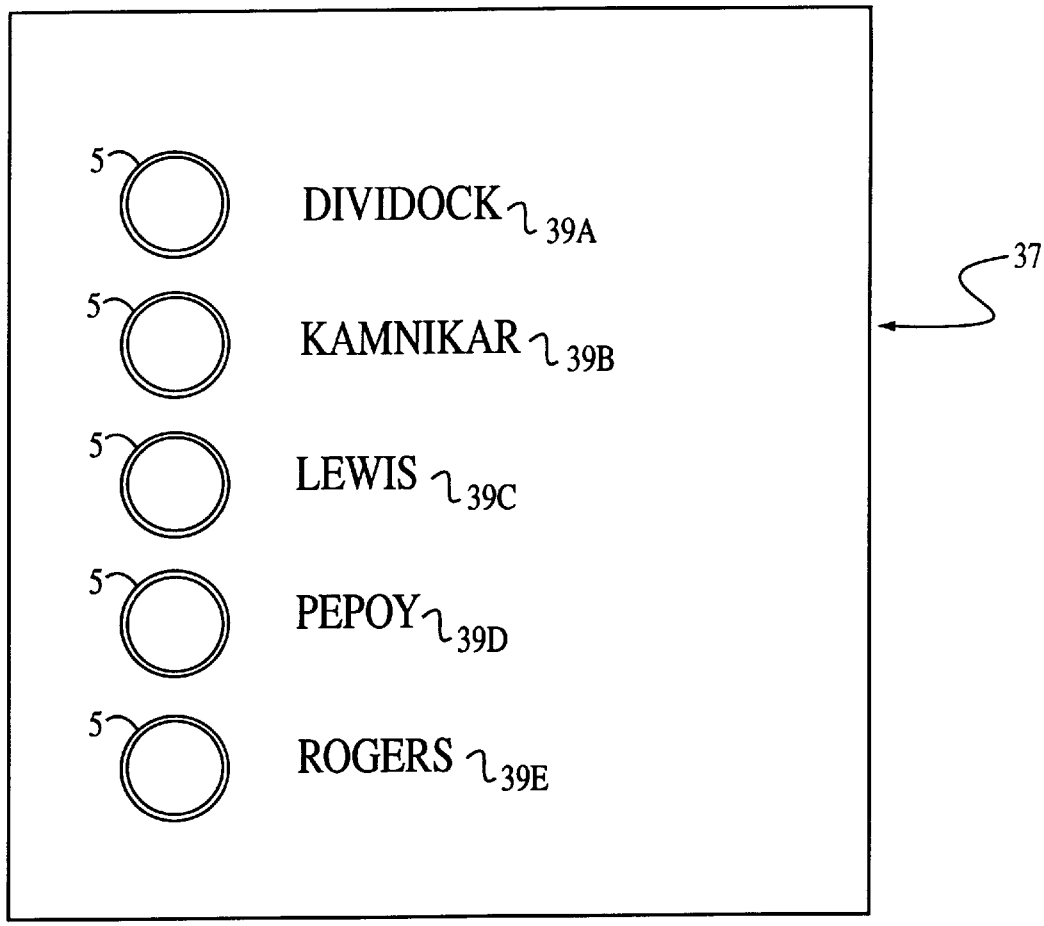
FIG. 4 is a plan view of a preferred embodiment of identity card showing a plurality of encoded buttons, each positioned to correspond to a different employee.

Referring to FIG. 4, a typical identity card 37 comprises a plurality of position marker buttons 5 each of which correspond to an individual employee 39A–39E assigned to perform floor safety inspection tours. Identity card 37 is typically maintained in the vicinity of downloading cradle 20, or individual employee code buttons can be attached to employee ID badges or the like. Whenever touch probe 33 is touched against an encoded button 5, the code is read out to portable data collector 15, which emits a beep and blinks light emitting diode 34, signaling that the unique code programmed into that encoded button 5 has been entered into the internal memory of portable data collector 15. The internal clock is also read and the date and time of each acquisition from an encoded button 5 is recorded in memory and indexed to the code.

Figure 5:
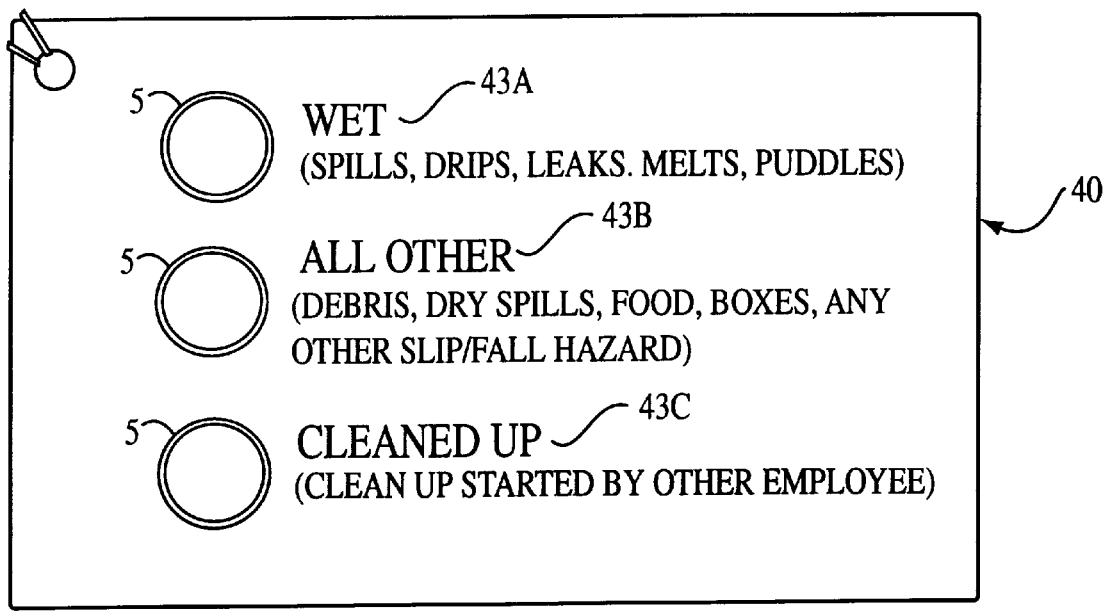
FIG. 5 is a plan view of a preferred embodiment of hazard identifier card including exception buttons.

Referring to FIG. 5, a preferred embodiment of exception card 40 comprises a plurality of encoded buttons 5, each of which is positioned on card 40 so as to be associated with a different type of hazard 43A–43B or clean-up 43C, listed on card 40 and/or represented by a descriptive icon or the like. Each button 5 is associated with a different hazard situation so that when touch probe 33 is placed against a particular button 5, an indication of the hazard associated with that particular button is entered in the memory of portable data collector 15. This information is associated with a location code entered immediately before (or after) the hazard code and is likewise associated with the current date and time.

Figure 6:
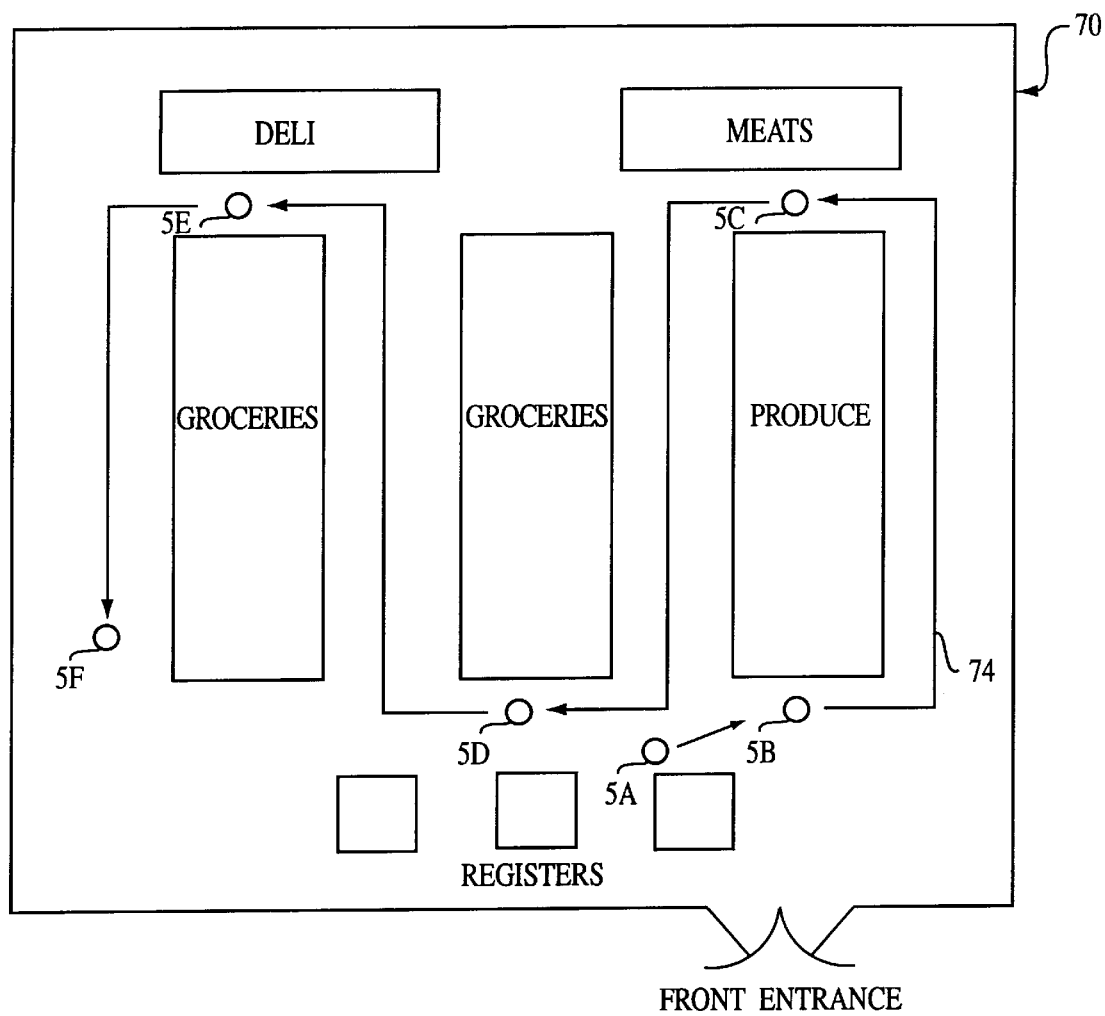
FIG. 6 is a plan view of a typical business premises (e.g., a grocery store), showing a possible placement of encoded button location markers, and a route of a floor safety inspection tour.

FIG. 6 shows the floor layout of an exemplary business 70. A periodic floor safety inspection tour 74 begins when a designated employee removes portable data collector 15 from downloading cradle 20 and touches touch probe 33 to an identity button 5 that has been associated with that employee's identity. This causes a code corresponding to the employee's name to be transferred into the internal memory of portable data collector 15. Next, the employee touches probe 33 to a first location button 5A, causing that button's code to be transferred into internal memory. The employee follows a designated tour route 74 of the floor safety inspection tour, continuing to touch various location buttons 5B–5E, sequentially, as he or she proceeds along designated tour route 74. If the tour is uneventful, and no slip-fall or other hazards are noted, the floor safety inspection tour concludes when the final location button 5F is touched by touch probe 33. The employee then returns touch probe 33 to downloading cradle 20, where it sits in receptacle 38 awaiting the next periodic floor safety inspection tour or polling from the central computer.

If the employee notes a slip-fall hazard during the floor safety inspection tour, he or she touches touch probe 33 to the appropriate exception button 43A–43B associated with the given hazard. By touching probe 33 to an exception button on hazard identifier card 40, an exception code that corresponds to "wet" or "other" type of hazard is entered into the internal memory of portable data collector 15. The employee then may stand by the hazard to warn people and notify another employee to clean up the hazard. The employee touches touch probe 33 to the exception button 43C designated to indicate "clean-up," on hazard identifier 40. At that point, the employee resumes the floor safety inspection tour as described above. Preferably, the entry of the hazard and clean-up codes are accompanied by entry of a location code as well.

Figure 3:
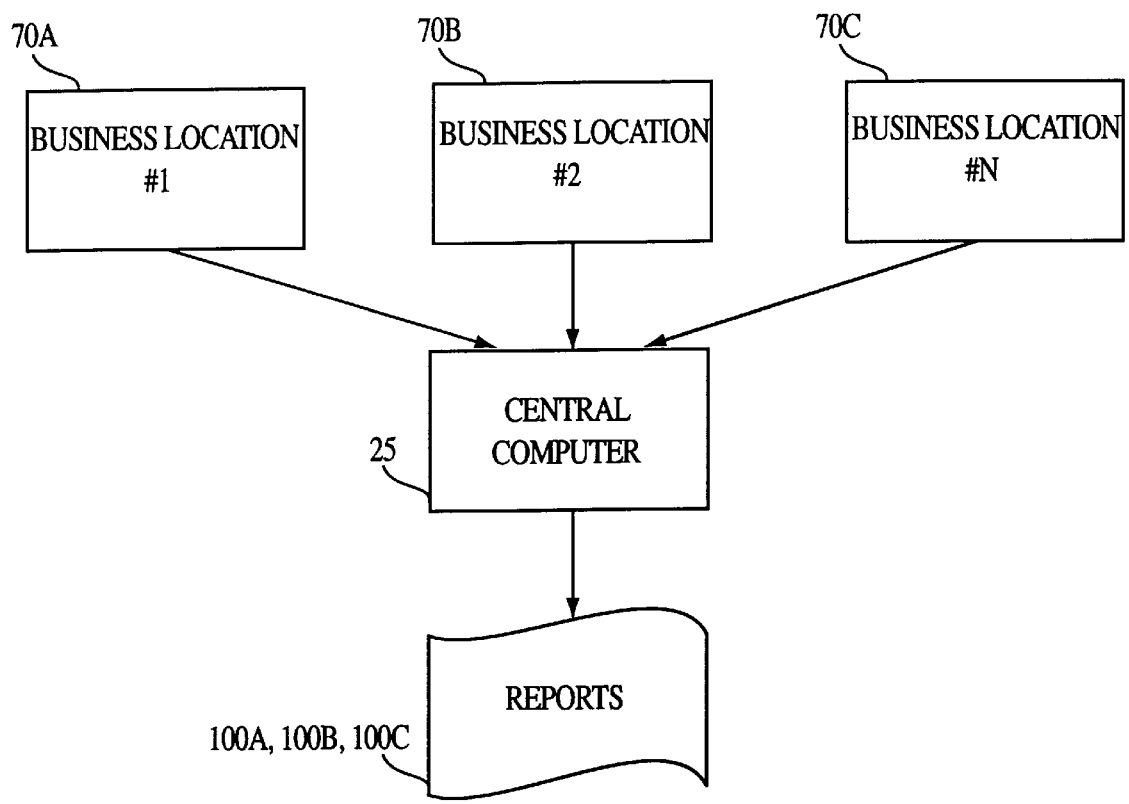
FIG. 3 is a schematic diagram of a system for remote logging of hazard information formed in accordance with a preferred embodiment of the invention.

Referring to FIG. 3, central computer 25 is located at a central location off site, such as a local insurance agency or the like, and is used for data management and printing of reports. Periodically, such as each week, central computer 25 accesses each downloading cradle 20 under control of internal software. The downloading cradles located at a number of different business premises 70A–70C served by the system can be accessed in turn over conventional voice telephone lines 35 (or another communications pathway such as the internet). The physical distance between the central computer 25 and business premises 70A–70C is limited only by the availability of a communications path, whereby the monitored business and the central computer can be located at any distance.

Figure 7:
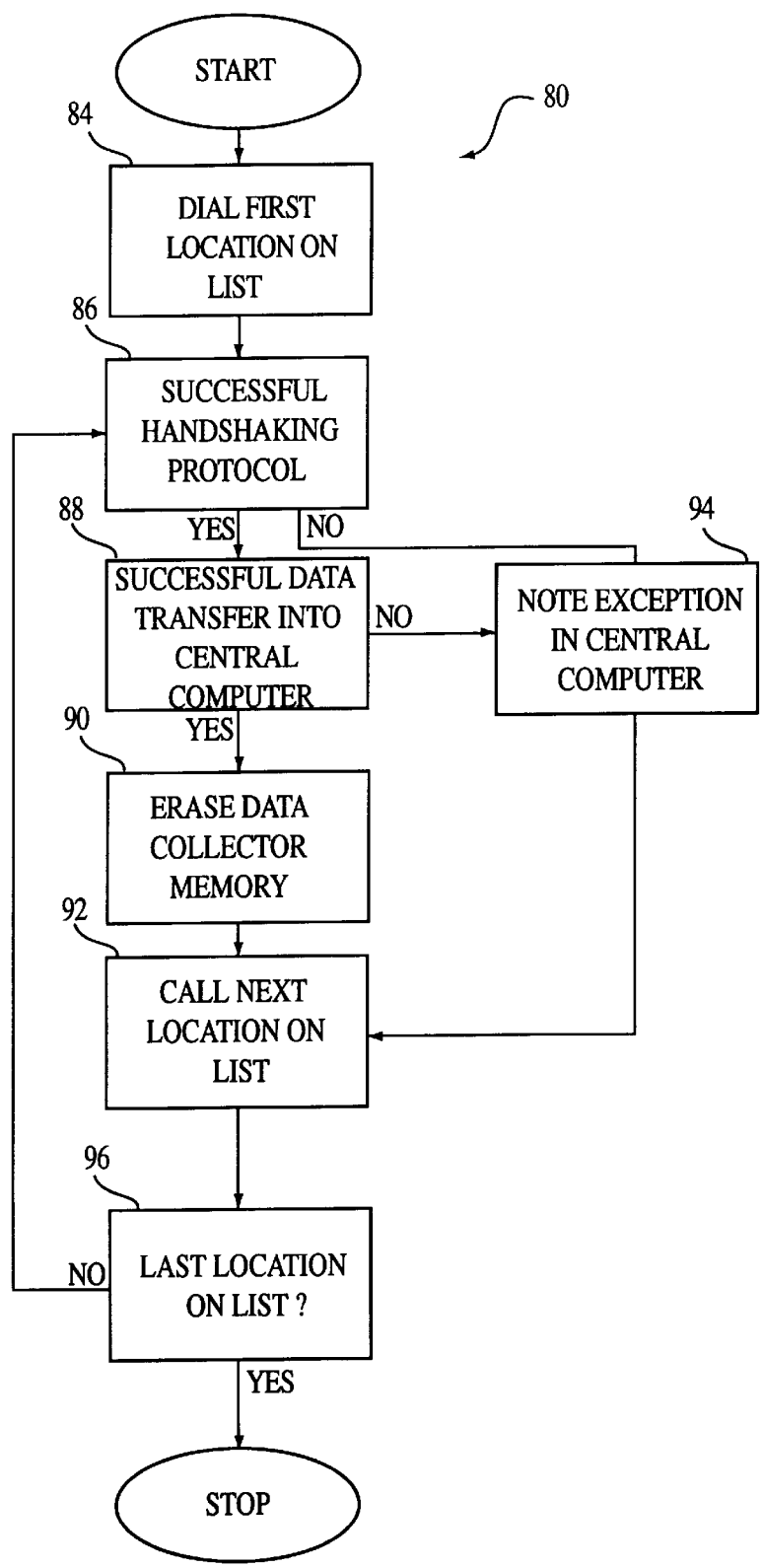
FIG. 7 is a flow diagram representing the data acquisition software protocol followed by a central computer as it telephones business locations and gathers data from each downloading cradle; and, FIG. 8 is a schematic diagram showing various reports that may be generated by the central computer according to the invention.

FIG. 7 shows a flow diagram showing data acquisition software means 80 preferred for use by central computer 25. Periodically, for example every night, at an off-hours time (e.g., midnight), software means 80 automatically starts dialing the telephone number of first business 70A on that night's list 84. When the modem located at a first business premises 70A answers the incoming call, central computer 25 and modem 36 begin normal communication protocols, i.e., handshake, etc., 86. If the handshaking protocol is successful, cradle 20 transfers the data stored in the internal memory of touch probe 33 over telephone line (or other communications pathway) 35, to the central computer 25 (shown generally at 88). If this data transfer is successful, central computer 25 sends a signal that erases the internal memory in portable data collector 15 and cradle 20 (shown generally at 90) or resets its indexing pointers and counters. Central computer 25 stores the newly-acquired data along with a code that identifies business location 70A, then telephones the next business location on its list 92. If either the handshaking protocol or the data transfer is unsuccessful for any reason, central computer 25 notes this exception in memory (shown generally at 94). The computer may try again one or more times, and/or may display or print an appropriate warning such that the next morning the program manager may intervene to ascertain the reason for the failure and correct it. The above protocol continues until central computer 25 reaches the last business location 70C on the night's list, at which point the procedure ends (shown generally at 96).

Figure 8:
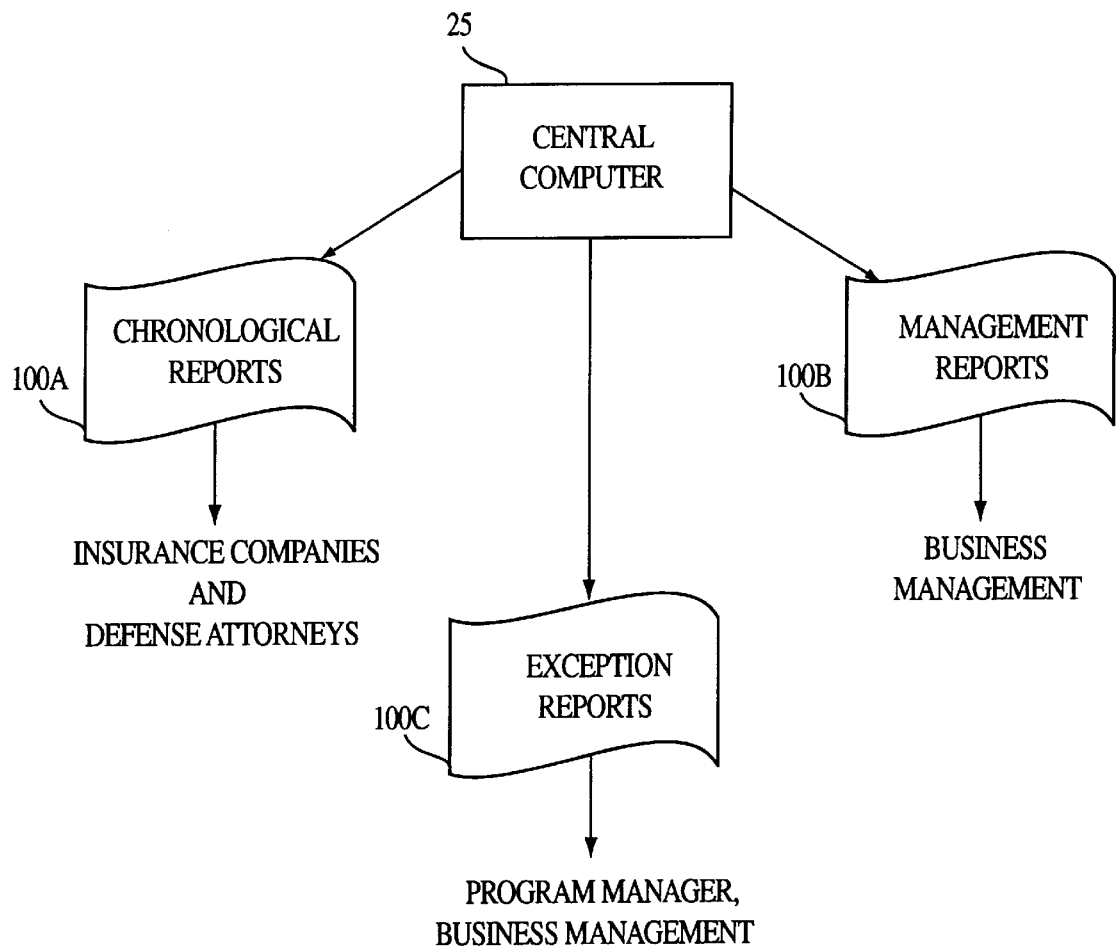

Referring to FIG. 8, reports are printed out by the program manager on an "as-needed" basis. There are three types of reports. Chronological reports provide a chronological print-out of each day's floor safety inspection tours, showing the identity of each employee performing floor safety inspections, each time that a position marker, 5A–5F was touched by a portable data collector 15, each time that an exception button 40 on hazard identifier 10 was touched (representing the detection of a slip-fall hazard and subsequent clean-up), and the number of completed floor safety inspection tours on the day in question. These chronological reports are furnished on an "as-needed" basis to insurance company claim representatives and defense attorneys to document that the business took reasonable precautions to prevent customer slip and fall injuries, and therefore was not negligent.

Exception reports are used by the program manager to perform compliance audits, which detect failures by store personnel to fully complete floor safety inspection tours. Exception reports are used to pinpoint the source of the failure, for example, to note if a particular employee failed to complete his or her assigned floor safety inspection duties. Exception reports also are provided to business management as appropriate.

Management reports 100A, 100B, 100C are furnished to business management to help them pinpoint problem areas within the store 70A–70C. For example, one management report may show the location 5A–5F within the business location 70A with the greatest number of exceptions, allowing floor safety efforts to be increased in these locations or allowing changes in the manner of storage of goods, etc. to ameliorate any dangers.

It is to be understood that the present invention is by no means limited to the particular constructions herein disclosed and shown in the drawings, but also comprises any modifications or equivalents within the scope of the claims.

What is claimed is:

1. A system for conducting premises inspections, to monitor and report the inspection and status of conditions at fixed locations distributed around said premises, comprising:

a plurality of encoded position markers, wherein at least one of said position markers is physically located adjacent to each of a plurality of said locations that define local inspection areas on the premises, and each said position marker is encoded with a unique code associated with its corresponding said local inspection area on the premises, and wherein each of the position markers is electronically readable only when in sufficient proximity with its corresponding said local inspection area to permit inspection of said local inspection area;

a portable data collector operable by an inspector to select from a list of code selections, each of the code selections comprising a predetermined code that identifies at least one of a particular individual inspector and a particular status of said local inspection area;

wherein the portable data collector is operable to read said unique codes of said plurality of position markers and to accept said code selections and thereby to associate the code selections with presence of the portable data collector within said sufficient proximity to said position marker to permit said inspection by said inspector; and, means for retrieving said location codes identifying said inspector, the local inspection areas and said associated code selections representing the hazardous condition status.

2. A system for conducting a premises safety inspection according to claim 1 including means positioned remotely from said premises for accessing said means for retrieving and downloading said inspector identity and location codes and said associated hazard-related condition codes.

3. A system for conducting a premises safety inspection according to claim 2 wherein said plurality of an electronically-encoded position markers include active code carrying devices read by a portable data collector.

4. A system for conducting a premises safety inspection according to claim 3 wherein said code selections for the portable data collector list are selected by uniquely coded active code carrying devices accessible to the inspector.

5. A system for conducting a premises safety inspection according to claim 1 wherein said list of entries of said portable data collector list comprise a listing including at least one of wet, broken debris, bodily fluids, maintenance-electrical, maintenance-mechanical, other, cleaned-up, and corrected.

6. A system for conducting a premises inspection according to claim 3 wherein said portable data collector is placed in mechanical engagement with said active code carrying device for reading.

7. A system for conducting a premises inspection according to claim 2 wherein said means comprises a general purpose computer operable to access said inspector identity and location codes and said associated hazard-related condition codes.

8. A system for conducting a premises safety inspection according to claim 2 further comprising a time clock for reading out a time at which the unique codes representing said inspector identity and location and said hazard-related condition are associated.

9. A method for conducting a premises safety inspection to monitor and report the inspection and status of conditions around the premises, comprising the steps of:

(A) locating a plurality of electronically-encoded position markers, at least one of said position markers being physically fixed adjacent to each of a plurality of spaced apart locations defining local inspection areas on and adjacent to said locations, each position marker being electronically readable only by an inspector who is in proximity with said position marker and therefore is located at a corresponding one of said local inspection areas when a corresponding said position marker is read, each of the position markers providing a unique code that identifies one predetermined location on said premises and one of said local inspection areas corresponding thereto;

(B) positioning said inspector in proximity to a first of said predetermined locations;

(C) the inspector observing the local inspection area associated with said first of the predetermined locations and determining a status of hazardous conditions at the local inspection area, the status at least representing one of existence of a hazardous condition and absence of a hazardous condition, the inspector selecting a corresponding hazard-related condition code;

(D) retrieving the unique code from said position marker located at said first of said predetermined locations and associating and recording the location code and the status;

(E) repositioning said inspector in proximity to a next one of the predetermined locations and repeating steps (C) through (D) until at least a predetermined group of said local inspection areas have been observed and a location code and a hazard-related condition code have been associated with each of said local inspection areas in the group; and, (F) subsequently accessing said retrieved recorded location codes and said associated hazard-related condition codes.

10. A method for conducting a premises safety inspection according to claim 9 further including the step of accessing said retrieved recorded location codes and said associated hazard-related condition codes by means safe from alteration by the inspector.

11. A system for conducting a premises safety inspection to monitor, document, and report the occurrence of hazardous conditions comprising;

a plurality of unpowered unique code carrying inspector identifiers;

a plurality of unpowered code-carrying position markers, at least one of said position markers being located at each of a plurality of spaced apart positions adjacent to said premises wherein each position marker is electronically readable when an inspector is in proximity thereto to provide a unique code that identifies a particular location on said premises;

a hazard identifier menu comprising a list of selectable entries, each entry corresponding to a particular hazardous condition and at least one entry corresponding to the absence of a hazard and including a plurality of electronically-active code selections, each code selection being (i) associated with one of said entries, and (ii) electronically readable to provide a predetermined code;

a portable data collector comprising means for communicating individually with said plurality of position markers and said code selections of said hazard identifier menu so as to associate one of said entries with each location on said premises and for recording each of said location codes and an associated one of said predetermined codes from said menu; and means for retrieving said location codes and said associated hazard-related condition codes from said portable data collector.

12. A system for conducting a premises safety inspection according to claim 11 including means located remotely from said premises for accessing said retrieving means and downloading said codes of the inspector identifiers, said location codes and said associated hazard-related condition codes.

13. A system for conducting a premises safety inspection according to claim 11 wherein said list of selectable entries is capable of indicating at least one of a no-observed-hazard status and an amelioration-of-hazard status.

* * * * *